US006993041B2

(12) United States Patent
Yamamoto

(10) Patent No.: US 6,993,041 B2
(45) Date of Patent: Jan. 31, 2006

(54) PACKET TRANSMITTING APPARATUS

(75) Inventor: Kanta Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 937 days.

(21) Appl. No.: 09/864,995

(22) Filed: May 24, 2001

(65) Prior Publication Data
US 2002/0097733 A1 Jul. 25, 2002

(30) Foreign Application Priority Data
Jan. 24, 2001 (JP) ............................. 2001-015615

(51) Int. Cl.
H04L 12/28 (2006.01)
(52) U.S. Cl. ............... 370/413; 370/395.43; 370/230.1
(58) Field of Classification Search ........ 370/229–238, 370/412–419
See application file for complete search history.

(56) References Cited

U.S. PATENT DOCUMENTS 5,838,922 A * 11/1998 Galand et al. .............. 709/232
6,570,873 B1 * 5/2003 Isoyama et al. ............ 370/375
6,667,984 B1 * 12/2003 Chao et al. ................. 370/414
6,771,596 B1 * 8/2004 Angle et al. ................ 370/229
6,888,841 B1 * 5/2005 Ozaki ......................... 370/413
2002/0110086 A1 * 8/2002 Reches ....................... 370/235

FOREIGN PATENT DOCUMENTS

JP 08251192 9/1996
JP 11346246 12/1999
JP 11275151 1/2000

* cited by examiner

Primary Examiner—Frank Duong
Assistant Examiner—Michael J. Moore
(74) Attorney, Agent, or Firm—Katten Muchin Rosenman LLP

(57) ABSTRACT

Disclosed is a packet transmitting apparatus for transmitting packets belonging to a plurality of groups having priorities that differ from one another. The apparatus includes a queue controller, which is provided in a scheduling unit, for generating queues on a per-group basis and giving a packet transmit privilege in order, in accordance with the round-robin method, to elements constituting each of the queues, queue by queue; and a packet-transmit group decision unit, which is provided in the scheduling unit, for deciding that a packet transmit group is a group having the highest priority among groups in which a packet corresponding to at least one queue element is awaiting to be transmitted. The queue controller gives the packet transmit privilege to the highest-priority queue element of a queue of the packet transmit group that has been decided and transmits the packet that corresponds to this queue element.

8 Claims, 13 Drawing Sheets

FIG. 5A

| PRIORITY GROUPS | PORT NO. & QoS | NUMBER |
|---|---|---|
| FIRST PRIORITY GROUP | P0-GS ~ P7-GS | 8 |
| SECOND PRIORITY GROUP | P0-CLS ~ P7-CLS | 8 |
| THIRD PRIORITY GROUP | P0-BE ~ P7-BE | 8 |
| FOURTH PRIORITY GROUP | P0-Spare ~ P7-Spare | 8 |

FIG. 5B

| PRIORITY GROUPS | PORT NO. & QoS | NUMBER |
|---|---|---|
| FIRST PRIORITY GROUP | P0-GS ~ P6-GS | 7 |
| SECOND PRIORITY GROUP | P7-GS<br>P0-CLS ~ P7-CLS<br>P0-BE | 10 |
| THIRD PRIORITY GROUP | P1-BE ~ P7-BE | 7 |
| FOURTH PRIORITY GROUP | P0-Spare ~ P7-Spare | 8 |

PACKET TRANSMITTING APPARATUS

BACKGROUND OF THE INVENTION

This invention relates to a packet transmitting apparatus for transmitting, in order, packets belonging to a plurality of groups having priorities that differ from one another. More particularly, the invention relates to a packet transmitting apparatus such as an IP router or Ethernet switch for switching variable-length packets.

When IP networks (the Internet) first appeared, there was no differentiated processing within the network and there was no processing for giving priority to a certain specific flow when allocating bandwidth. In the initial form of the Internet, bandwidth allocation was on the basis of "first come, first served", and the more data there was to be sent, the larger the network bandwidth that was occupied. Scheduling logic, therefore, also was simple FIFO (first in, first out).

However, the era has gradually come to expect that IP networks send multimedia information, namely moving images and voice, and not just electronic files, e-mail and still images. Multimedia information such as moving images and voice is traffic in which it is anticipated that the information will be transmitted from the transmission source to the transmission destination "at a certain, fixed bandwidth and fixed period and without loss of data" as the term "real-time traffic" attests. Real-time traffic until now has been traffic in which information is exchanged by so-called telephone networks, wherein communication is carried out after reserving a fixed bandwidth from the transmission source to the transmission destination.

The enormous amount of packet data from an ever increasing number of Internet users has led to packet congestion within the network and many packets are now starting to be discarded because they cannot be processed in the network. Many users are now experiencing a decline in throughput to an extent visible to the eye. This has led to requests that throughput be raised in exchange for the payment of fees higher than those paid by other users. This is often compared to the difference between a common road and a highway. Having a fixed bandwidth assured is equivalent to travel on a highway, while having various traffic scramble for bandwidth is likened to travel on a common road. However, it should be noted that in the case of an IP network, merely assuring traffic on the highway means taking network resources (bandwidth) away from the common road, as a result of which the common road becomes even more congested.

The above-mentioned circumstances have resulted in the need for bandwidth control and priority control in IP networks that aim at effective exploitation of bandwidth by statistical multiplexing. Differentiation on the Internet is now in the process of being defined and established as service policy by QoS (Quality of Service), Diffserve and Intserve, etc. With service policy based upon the idea of differentiation, services for various packet flows are managed by packet-flow classification, stipulation of input-traffic characteristics, stipulation of packet-discard priority and stipulation of bandwidth assurance, etc.

Strict queuing and weighted fair queuing (WFQ) are typical examples of bandwidth control schemes.

Strict queuing is a simple priority scheme in which if a packet is one that has been set to a high priority, the packet is always given precedence and sent first. FIG. 8 is a diagram useful in describing the simple priority scheme, in which numerals $1_1$ to $1_4$ denote clients, 2 a router and 3 an application server. This is for a case where each of the clients $1_1$ to $1_4$ transmits packets to the server 3 via the router 2, where P represents the priority; the larger the value of P, the higher the priority. If packets (1) to (4) enter respective ports from the clients $1_1$ to $1_4$ simultaneously, the router 2 sends the packets to the server 3 in order of decreasing priority which, in FIG. 8, is the order (3)→(2)→(4)→(1).

FIG. 8 is for the simple case, in which packets are no longer transmitted in simple FIFO (first in, first out) order when priority control is carried out. In FIG. 9, it will be understood that packet (5) is transmitted before packet (1) despite the fact that packet (1) arrived before packet (5). Thus, with strict queuing, if packets having a high priority arrive successively, packets of low priority are not sent until the transmission of packets having a higher priority is completed. Consequently, the possibility that a packet of low priority will remain in a queuing memory is high. If there is input beyond a certain threshold, low-priority packets are discarded.

A characterizing feature of strict queuing is that very strict priority control is carried out and scheduling processing also is very easy and simple. However, the setting of bandwidth and the setting of priority cannot be performed with a high degree of freedom between flows.

Weighted fair queuing is a scheme in which priority ratio (weight) is decided using order of priority as an analog parameter, and packets are transmitted in accordance with the ratio decided. FIGS. 10 and 11 are diagrams useful in describing weighted fair queuing. Here clients $1_1$, $1_2$, $1_3$ and $1_4$ are assigned priority ratios of 12.5%, 12.5%, 25% and 50%, respectively, with respect to a single port on the server 3. With weighted fair queuing, bandwidth allocation processing in accordance with the ratios is executed without a strict inclination toward a specific priority as in the case of strict queuing (see FIG. 11).

With weighted fair queuing, however, priority-ratio control is applied to variable-length packets. When weighted control is carried out based upon the number of packets forwarded, the difference between packets of minimum size and maximum size is not recognized. If an Ethernet frame is taken as an example, minimum size is 64 bytes and maximum size is 1522 bytes. If router 2 is to send packets from clients $1_1$ and $1_2$ alternately to server 3, therefore, as shown in FIG. 12, a large difference in which priority-ratio error increases almost 24-fold occurs. A method of solving this problem is to segment variable-length packets into a fixed-length size and perform control based upon the number of transfers of fixed-length data, as shown in FIG. 13.

With this method, however, a problem which arises is that a segmenting processor and a reassembly processor are required respectively in front of and in back of a routing or switching unit (not shown) in the router 2. In particular, it must be assumed that a plurality of packets will undergo reassembly simultaneously in the reassembly processor, logically or physically separate reassembly buffers must be provided for each of these packets and the buffers must be controlled. FIG. 14 is a diagram useful in describing packet transmission control in the router. Shown in FIG. 14 are a packet switch 2a, a scheduler 2b, reassembly buffers $2c_1$, to $2c_4$ for reassembling packets from each of the clients, and a packet read-out unit 2d for reading packets out of the buffers.

(1) First Problem

The weighted fair queuing scheme introduces the concept of a virtual clock on a per-packet basis. A virtual clock is the time needed for a packet to be output from a device, i.e., the time during which the packet exists in the device. Virtual clock information must be managed individually packet by packet inside the device, and the generation and management of this information entails a great amount of processing. In other words, the scheduler in weighted fair queuing must generate and manage a great deal of complex control information for all packets that exist inside the device, scheduling processing is complicated and processing time is prolonged.

(2) Second Problem

When a variable-length packet is segmented into fixed-length data such as ATM cells and the scheduler also performs schedule management in units of the fixed-length data, scheduler control is comparatively easy. In order to accomplish this, however, processing for segmenting variable-length packets is required in front of the routing unit and switch unit, and reassembly processing is required in back of the switch unit. Accordingly, it must be kept in mind that a plurality of packets will undergo processing simultaneously in buffers for reassembling a variable-length packet in back of the switch unit, and it is necessary that a logically or physically separate reassembly buffer be provided for each of these packets. A problem which arises is an increase in the scale of the apparatus.

(3) Third Problem

It is desired that physical bandwidth be usable with 100% effectiveness. To achieve this, it is required that a variable-length packet be output to its destination by stuffing in the packet data without leaving needlessly unallocated bandwidth and without any gaps in terms of time. However, with a complicated scheduler arrangement, as in the prior art, the time for a single scheduling processing cycle is prolonged and packet data cannot be output to the output destination without gaps.

(4) Fourth Problem

The conventional scheduler processes queues, which are to undergo scheduling, in a single stage, and the setting of priorities also is performed by setting all queue elements (e.g., packets) as objects to be scheduled. In the conventional schemes, the round-robin method is adopted so that a grant is made to rotate from one queue element to another. The round-robin method is such that if a certain queue element acquires a grant, the priority of this queue element is reduced to the lowest level in the next cycle of scheduling processing. Though the round-robin method is suited to fair scheduling, it cannot be employed as is in non-linear bandwidth allocation control (i.e., in differentiated service). For example, with regard to queue elements the bandwidth of which has been set high, it is necessary to raise the frequency with which transmission grants are given. The conventional round-robin scheduler, however, cannot perform such scheduling control.

(5) Fifth Problem

Physical bandwidth assurance schedulers that handle variable-length packets are classified broadly into two types. One uses a method of performing scheduling by segmenting variable-length packet data into fixed-length data, and other uses a method of performing scheduling using the variable-length packet data as is. The present invention adopts the method of performing scheduling using the variable-length packet data as is. In this method, a transmission grant from a scheduler generally is output in packet units. In this case, the length of packet data transferred by a single transmission grant is not fixed. In other words, even though a single transmission grant is rotated equally among the queue elements, the same physical bandwidth is not occupied. If this takes place several dozen or several hundred times, in the worst case bandwidth allocation to the queue elements becomes unfair regardless of the fact that the transmission grant is caused to rotate among elements the same number of times. This is the reason why bandwidth assurance control is difficult in a scheduler that handles variable-length packets.

(6) Sixth Problem

The fifth problem, namely unfairness in the transmission of variable-length packets, is eliminated by stipulating the transmission assurance bandwidth in a single transmission grant. In this case, it is necessary to stipulate processing in an instance where a packet to be transmitted ceases existing before the assured bandwidth is attained. A method of waiting for arrival of the packet is available as a method of such processing. This is a method of issuing transmission grants continuously to queue elements of interest until the assured bandwidth is attained. However, 100% utilization of physical bandwidth is impossible and the problem of needlessly unallocated bandwidth arises.

(7) Seventh Problem

As mentioned above, a variable-length scheduler cannot use information indicative of packet transfer count in order to implement fair bandwidth allocation. The reason for this is as follows: Even if there are the same ten packets of data, unfairness occurs, despite an identical bandwidth setting, in a case where there are a large number of minimum-size packets from one queue element and a large number of maximum-size packets from another queue element. Accordingly, it is necessary to arrange it so that exact bandwidth control can be carried out even in the case of variable-length packets.

SUMMARY OF THE INVENTION

Accordingly, an object of the present invention is to make bandwidth control possible, without segmenting variable-length packets, by making joint use of strict queuing and weighted fair queuing, thereby reducing the scale of scheduler circuitry and raising the speed of processing.

Another object of the present invention is to adopt, as queue elements, combinations of input ports and quality classes appended to packets that enter from these ports, and perform bandwidth control and priority control in units of these queue elements and not in packet units, thereby reducing the scale of scheduler circuitry and raising the speed of processing.

Another object of the present invention is to dispense with the need for packet segmenting processing in front of a routing unit or switch and packet reassembly processing in back.

Another object of the present invention is to so arrange it that processing time of a single scheduling cycle is shortened, i.e., so that scheduling processing time will fall within the transmission time of minimum-length packets.

Another object of the present invention is to classify queue elements into absolute-priority groups of a plurality of stages and give packet transmission privilege to each of the queue elements in regular order within the groups by the round-robin method, thereby raising the frequency with which transmission grants are delivered to specific queue elements of high priority even by the simple round-robin method.

Another object of the present invention is to select a priority group by a simple absolute-priority scheme, thereby making it possible to execute high-speed scheduling processing by simple hardware.

Another object of the present invention is to arrange it so that queue elements belonging to each priority group can be set at will and so that no limitation is imposed upon the number of these elements, and to make it possible to perform bandwidth control even if there is an imbalance in the ratio of the flowrate of a group having a high priority to the flowrate of a group having a low priority.

Another object of the present invention is to make it possible to control bandwidth allocated to each queue element by setting assured bandwidth based upon a single transmission grant with regard to each queue element.

Another object of the present invention is to so arrange it that if packets to be transmitted successively no longer exist, a transmission grant with regard to the particular queue element is rescinded immediately, the transmission grant is delivered to another queue element and needlessly unallocated bandwidth is eliminated in shared physical bandwidth so that bandwidth can be utilized 100%.

Another object of the present invention is to implement exact bandwidth control by setting data transmission flowrate (bandwidth) of packets, which are transmitted per prescribed period of time, for every quality class (queue element) of each input port.

A first packet transmitting apparatus according to the present invention comprises: (1) a queue controller for generating a queue for every group of a plurality of groups having priorities that differ from one another, and giving packet transmit privilege in order to elements constituting each of the queues; and (2) a packet-transmit group decision unit for deciding that packet transmit group is a group having the highest priority among groups in which a packet corresponding to at least one queue element is awaiting to be transmitted; wherein the queue controller transmits a packet, which corresponds to a queue element having the packet transmit privilege, in the queue of the packet transmit group.

A second packet transmitting apparatus according to the present invention further comprises (3) a group setting unit for adopting, as queue elements, combinations of input ports and quality classes added onto packets that enter from these ports, and setting groups to each of which these queue elements belong; wherein the queue controller gives the packet transmit privilege, equally and in order in round-robin fashion, to each of the queue elements queue by queue.

A third packet transmitting apparatus according to the present invention further comprises: (4) a buffer for storing a packet, which is waiting to be transmitted, for every queue element; and (5) a request generator for generating a transmit request signal for every queue element corresponding to a buffer in which a packet waiting to be transmitted has been stored; wherein the transmit-group decision unit identifies groups in which a packet waiting to be transmitted exists based upon whether or not there is a transmit request signal from at least one of queue elements belonging to each of the groups, and decides that a group having the highest priority among these groups is the packet transmit group.

A fourth packet transmitting apparatus according to the present invention further comprises: (6) an assured-data-quantity setting unit for setting a data transmission quantity, which is assured by a single packet transmit privilege, for every queue element; (7) a monitoring unit for monitoring an actual transmission quantity of a packet corresponding to a queue element to which the packet transmit privilege has been given; and (8) a control signal generator for outputting a control signal, which is for delivering the transmit privilege to the next queue element, when the actual data transmission quantity has become equal to the assured data quantity; wherein the queue controller gives the packet transmit privilege to the next queue element based upon the control signal.

A fifth packet transmitting apparatus according to the present invention further comprises: (9) a data-transmission flowrate setting unit for setting data transmission flowrate of a packet, which is transmitted per set period of time, for every queue element; (10) means for monitoring actual data transmission flowrate per the set period of time for every queue element; and (11) packet-transmit inhibiting means for monitoring the actual data transmission flowrate for every queue element, and generating a transmit-inhibit signal which inhibits transmission of a packet corresponding to the queue element, until the set period of time elapses, when the data transmission flowrate has become equal to the set data transmission flowrate.

The packet transmitting apparatus of the present invention transmits a packet through a two-stage arrangement consisting of processing concerning to which priority group a transmission grant is to be issued and processing concerning to which queue element of this priority group a transmission grant is to be issued. As a result, packet transmission control can be performed through a simple arrangement.

Further, the packet transmitting apparatus of the present invention executes scheduling processing, with variable-length packet data as is, without segmenting the variable-length packet data. As a result, bandwidth allocation control can be implemented accurately and freely for every queue element, i.e., for every quality class of each port.

Further, the packet transmitting apparatus of the present invention generates a transmit request signal to a scheduler in units of the quality class of each input port, not in packet units. This makes possible a large-scale reduction in the scale of the circuitry as well as an increase in speed.

Further, the packet transmitting apparatus of the present invention does not issue transmission grants in data units obtained by segmentation into fixed length but instead issues transmission grants in units of variable-length packet data. As a result, the packet data per se can be forwarded without being segmented and there is no need for segmentation processing for the segmenting of variable-length packets and for reassembly processing.

Further, the packet transmitting apparatus of the present invention is such that the scheduler is implemented by hardware. This makes high-speed scheduling decisions possible so that the time for a single scheduler decision can be kept within the time needed for physical transmission of minimum packet length. As a result, delay due to scheduler processing is reduced so that even if packets of the minimum packet size have been input successively, it is possible to transmit packets successively while eliminating physically idle bandwidth.

Further, the packet transmitting apparatus of the present invention is so adapted that a priority group can be set freely. This makes it possible to deal with a situation in which the ratio of the number of queue elements of high priority to the number of queue elements of low priority is not in balance.

Further, the packet transmitting apparatus of the present invention is such that a packet conforming to a queue element to which a transmission grant has been issued is given the grant until the assured transmission bandwidth is exceeded. As a result, even if the apparatus is of the packet-by-packet type, physical bandwidth assurance (bytes per second or bits per second) is possible in a single transmission grant. Further, if transmission of all packets is completed before the actual used bandwidth becomes equal to the assured transmission bandwidth, the transmission grant is rescinded immediately, thereby making it possible to prevent the occurrence of wasteful physically idle bandwidth.

Further, the packet transmitting apparatus of the present invention basically is a round-robin scheduler for simple priority control. However, by adopting an arrangement in which packet-by-packet flowrate information is fed back, high-speed scheduling processing implemented by hardware becomes possible. Moreover, control for absolute allocation of physical bandwidth becomes possible in units of bytes per second or bits per second.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A and 5B show examples of priority groups;

DESCRIPTION OF THE PREFERRED EMBODIMENTS (A) First Embodiment (a) Overall Structure of the Packet Transmitting Apparatus FIG. 1 is a block diagram illustrating a packet transmitting apparatus 10 according to the present invention. This packet transmitting apparatus is such that when packets are to be transmitted to a transmission line, the transmission is made in accordance with predetermined scheduling on the basis of input ports $P_0$ to $P_n$ at which the packets arrive and the quality classes of the input ports.

As shown in FIG. 1, the packet transmitting apparatus 10 includes n-number of input ports and a single output port, input transmission lines $11_0$ to $11_n$ and an output transmission line 12. The packet transmitting apparatus 10 transmits packets to the output transmission line while performing priority control and bandwidth control based upon combinations of the input ports $P_0$ to $P_n$ and quality classes (service classes) of packets input from these input ports.

If the packet transmitting apparatus 10 is in accordance with the SONET scheme, the apparatus includes input-side interfaces $21_0$ to $21_n$ for optoelectronically converting signals that enter from respective ones of the transmission lines and performing interface control such as SONET termination processing and packet separation processing; forwarding units $22_0$ to $22_n$ for applying processing such as the appending of in-apparatus headers to packets that enter from the input-side interfaces and outputting the resulting packets; ingress-side queuing units $23_0$ to $23_n$ for distributing and queuing, on a per-QoS basis, packets that enter from the forwarding units; a scheduling unit 24 for transmitting packets, which have been stored in queuing buffers in each of the queuing units $23_0$ to $23_n$, on the basis of schedule control; an egress-side queuing unit 25 for queuing and outputting, in regular order, packets output from the scheduling unit 24; and an output interface 26 for performing electrooptic conversion, deletion of in-apparatus headers and generation of SONET frame signals and sending the results to the output transmission line 12.

Figure 1:
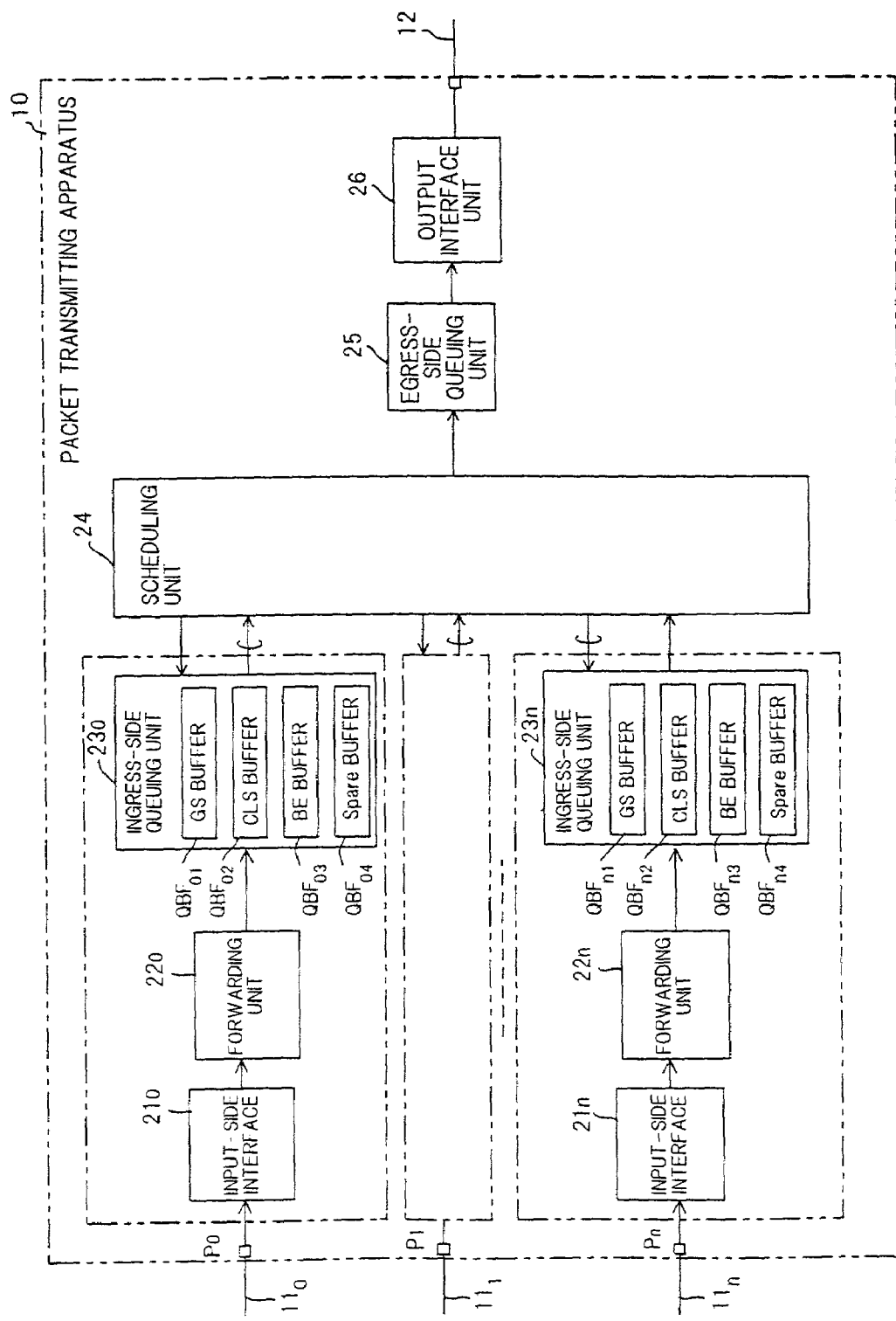
FIG. 1 is a block diagram illustrating a packet transmitting apparatus according to the present invention.
Figure 2:
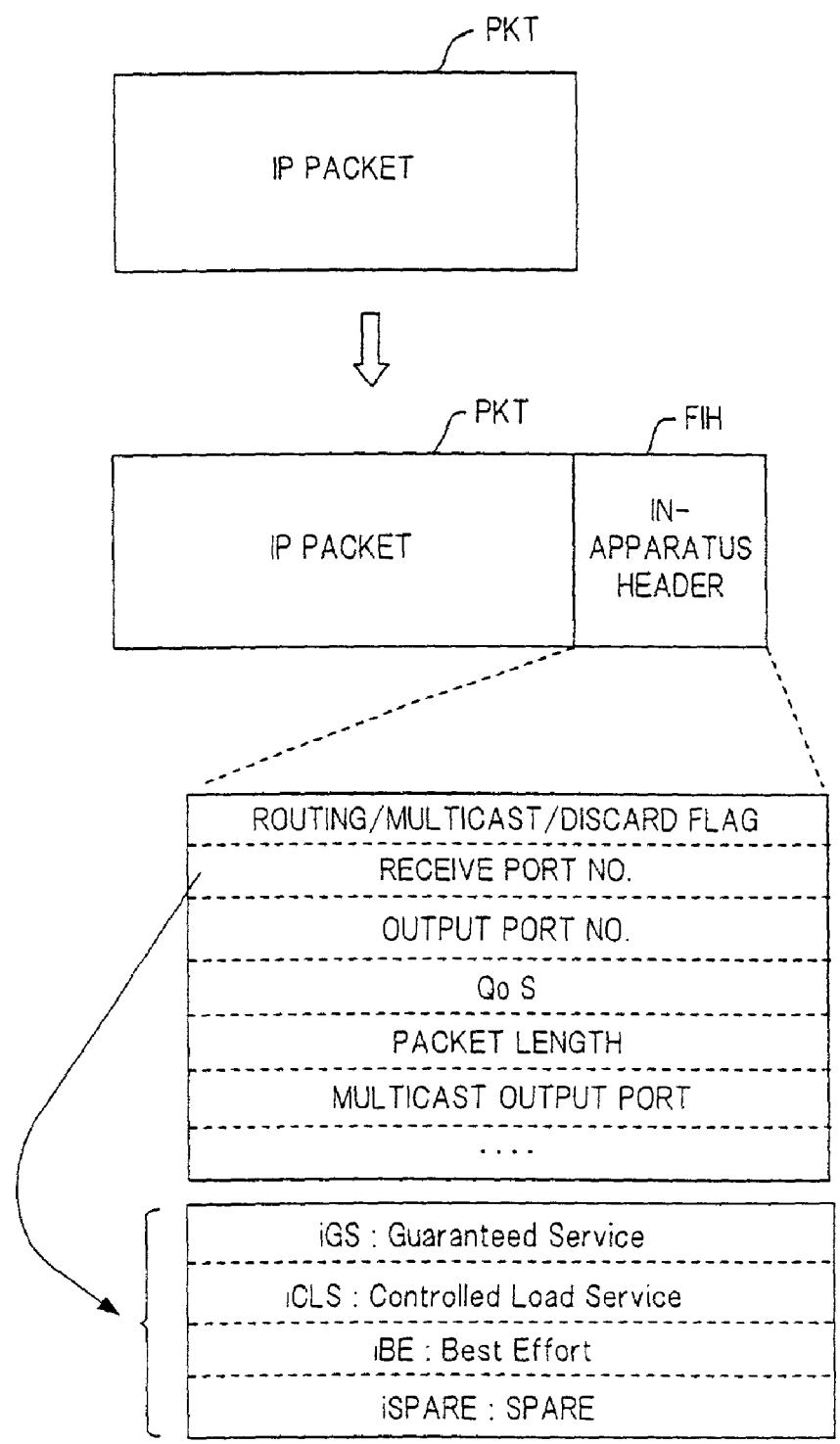
FIG. 2 is a diagram showing the structure of a header in the apparatus.

Each of the forwarding units $22_0$ to $22_n$ adds an in-apparatus header FIH (Frame Information Header) onto an IP packet PKT, as shown in FIG. 2, and outputs the result. The header FIH includes the following, by way of example: (1) a routing/multicast/discard flag, (2) a receive port number, (3) an output port number, (4) QoS (Quality of Service), (5) packet length and (6) multicast output port. The QoS includes the following four service classes (quality classes):

(1) iGS (Guaranteed Service class);
   (2) iCLS (Controlled Load Service class);
   (3) iBD (Best Effort class); and
   (4) iSpare (Spare class).

The iGS is a service class which assures a requested bandwidth, the iCLS is a service class which assures a predetermined minimum bandwidth, the iBE is a service class for which no quality is specified, and the iSpare class is a spare class. Each of the forwarding units $22_0$ to $22_n$ decides the service class based upon any one of or a combination of IP address (transmission source address/destination address), receive port number, layer-4 protocol (TCP/UDP) and service category (WEB/FTP/TELNET), and adds the decided service class onto a packet.

Each of the ingress-side queuing units $23_0$ to $23_n$ has a total of four queuing buffers $QBF_{i1}$ to $QBF_{i4}$ (i=0 to n) for respective ones of the service classes, refers to the QoS of packets that enter from the corresponding one of the forwarding units $22_0$ to $22_n$ and stores the packets in the queuing buffers $QBF_{i1}$ to $QBF_{i4}$ on a per-service-class basis. Further, each of the ingress-side queuing units $23_0$ to $23_n$ transmits packets in order in accordance with grants from the scheduling unit 24.

(b) Scheduling Unit

Figure 3:
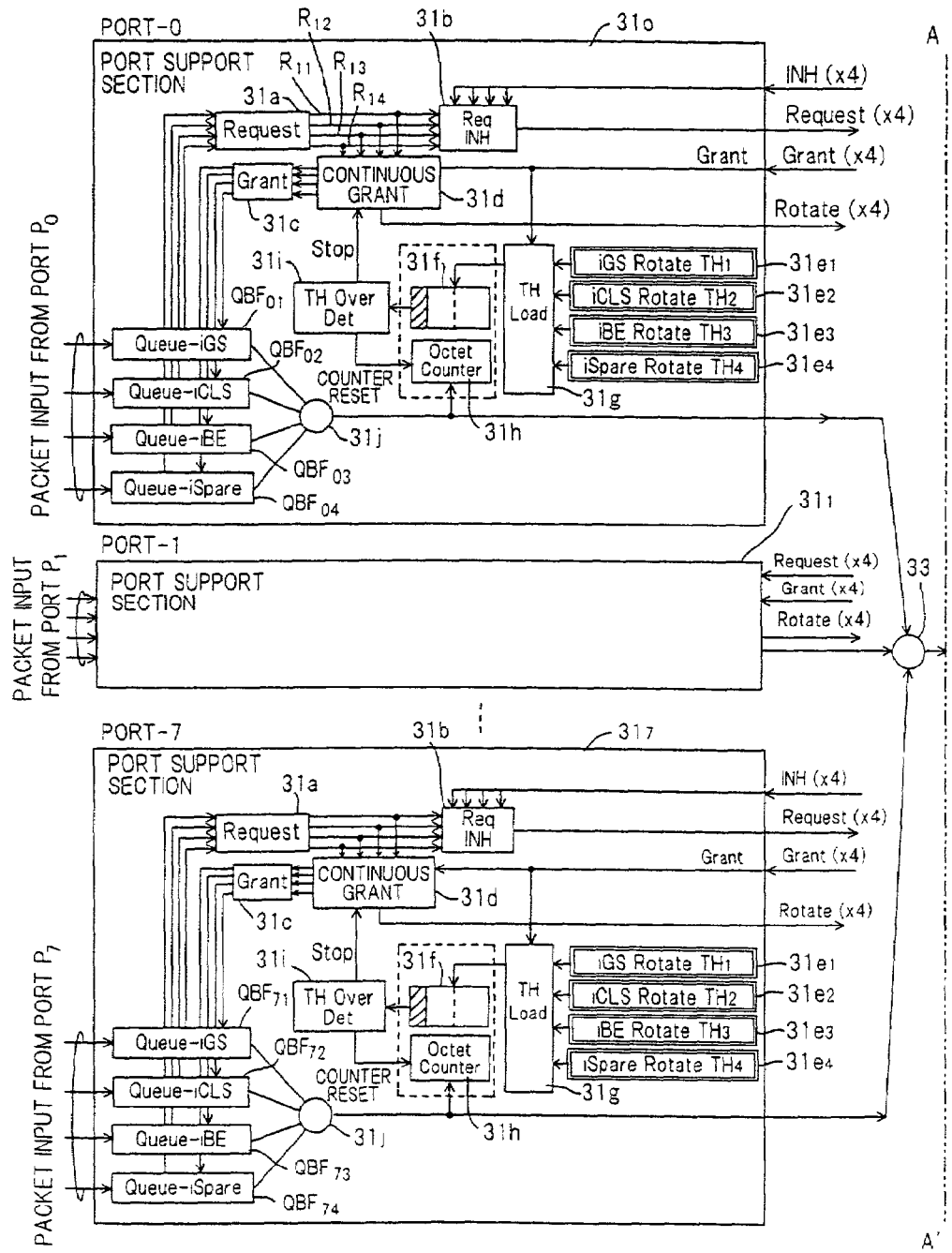
FIG. 3 is a diagram (part 1) showing the details of a scheduling unit.

Packets that have been queued in the queuing buffers $QBF_{01}$ to $QBF_{04}$, ..., $QBF_{71}$ to $QBF_{74}$ of the ingress-side queuing units $23_0$ to $23_n$ are transmitted by the scheduling unit 24 in order by schedule control. The scheduling unit 24 has the structure shown in FIGS. 3 and 4. FIG. 3 illustrates the part of the scheduling unit 24 that includes the queuing buffers $QBF_{01}$ to $QBF_{04}$, ..., $QBF_{71}$ to $QBF_{74}$ of the queuing units $23_0$ to $23_n$.

Figure 4:
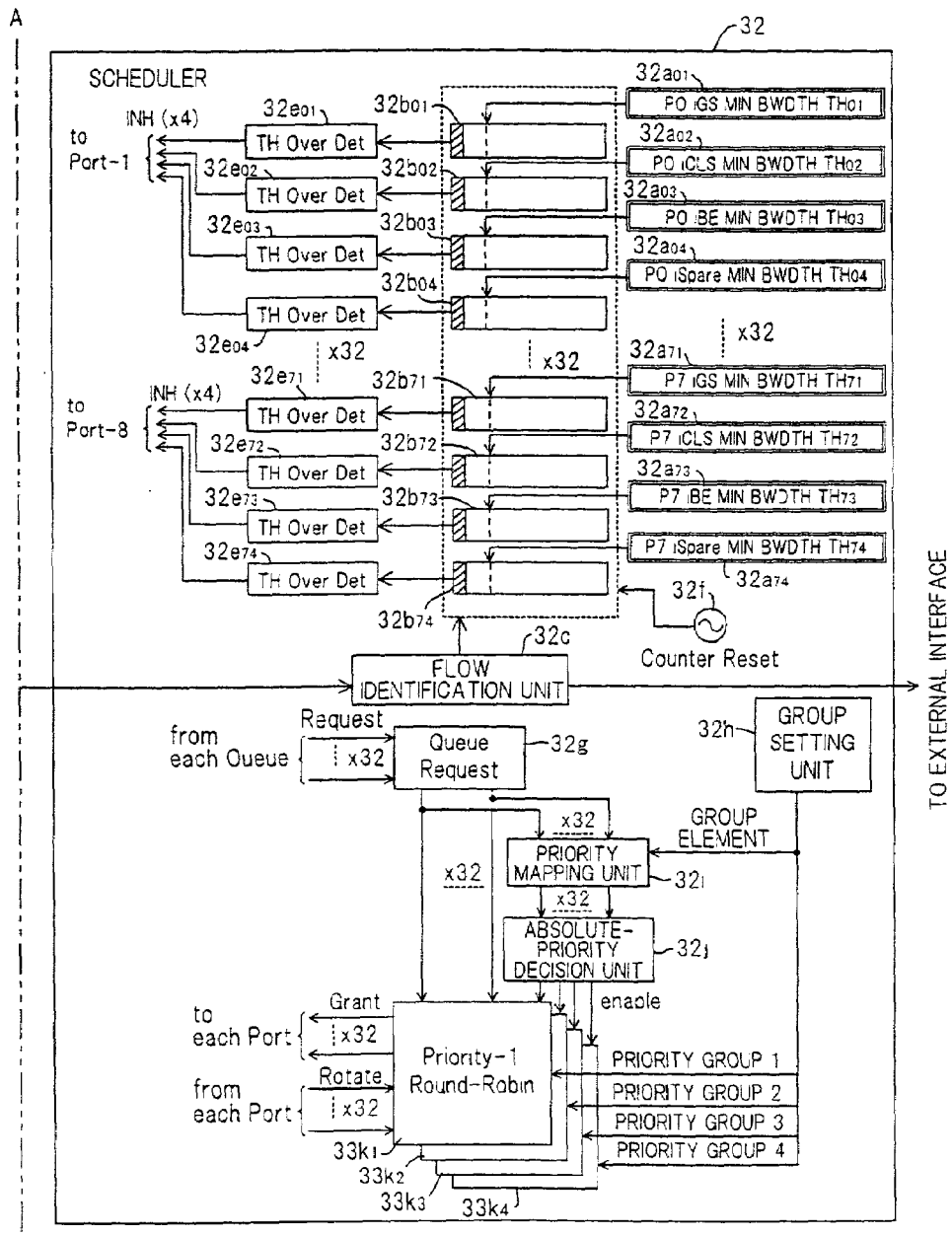
FIG. 4 is a diagram (part 2) showing the details of the scheduling unit.

More specifically, FIGS. 3 and 4 are diagrams illustrating the structure of the scheduling unit 24, in which the first half of the scheduling unit 24 is shown in FIG. 3 and the second half in FIG. 4. Broadly speaking, the scheduling unit 24 includes port support sections $31_0$ to $31_7$ (n=7), a scheduler 32 and a packet combiner 33. The port support sections $31_0$ to $31_7$ are identical in structure.

(b-1) Port Support Section

The port support section $31_0$ distributes and queues, on a per-service-class (quality-class) basis, packets that enter from the port $P_0$, and transmits the packets based upon grants from the scheduler 32. This section includes a GS buffer $QBF_{01}$, CLS buffer $QBF_{02}$, BE buffer $QBF_{03}$ and Spare buffer $QBF_{04}$. Similarly, the port support sections $31_i$ (i=1 to 7) each distribute and queue, on a per-service-class basis, packets that enter from the ports $P_i$ (i=1 to 7), and transmit the packets based upon grants from the scheduler 32. Each section includes a GS buffer $QBF_{i1}$, CLS buffer $QBF_{i2}$, BE buffer $QBF_{i3}$ and Spare buffer $QBF_{i4}$.

Each support section $31i$ (i=0 to 7) includes, in addition to the foregoing, a request signal generator $31a$, a request inhibit unit $31b$, a grant unit $31c$, a successive grant unit $31d$, transmission-assured-bandwidth storage units $31e_1$ to $31e_4$, a register $31f$, a set-value loading unit $31g$, an octet counter $31h$, a comparator $31i$ and a combiner $31j$.

When packets are present in the queuing buffers $QBF_{01}$ to $QBF_{04}$, the request signal generator $31a$ generates request signals (requests) $R_{11}$ to $R_{14}$ that are for requesting grants. When packets of a predetermined service class exceed a set quantity in a set period of time, the request inhibit unit $31b$ masks the request signal in order to inhibit transmission of the packets of this service class, thereby inhibiting the input of the request signal to the scheduler 32. The grant unit $31c$ allows the forwarding of packets to the queuing buffers $QBF_{01}$ to $QBF_{04}$ based upon grant signals that enter from the scheduler 32. The successive grant unit $31d$ issues grant signals successively for forwarding packets and, when a predetermined requirement has been met, inputs a rotate signal to the scheduler 32 so as to provide a packet transmit privilege to the next queue element. The predetermined requirement is (1) that a data quantity transmittable by a single grant (the assured data quantity for transmission) has been transmitted, or (2) that all packets have been transmitted from a buffer before the actual transmission data quantity becomes equal to the assured data quantity transmittable by a single grant. If either of these requirements is met, the successive grant unit $31d$ halts the output of the grant signal and outputs the rotate signal.

The transmission-assured-bandwidth storage units $31e_1$ to $31e_4$ store, on a per-service-class basis, assured data quantities (bytes per second) $TH_1$ to $TH_4$ transmittable by a single grant, and the set-value loading unit $31g$ loads a set data quantity, which conforms to the service class of the input port to which a grant has been given, into the register $31f$. The octet counter $31h$ counts the number of octets of packet data to actually be transmitted, and the comparator $31i$ compares the number of octets of packet data to actually be transmitted and an assured data quantity $TH_i$ that has been set in the register $31f$. The comparator $31i$ outputs a stop signal and resets the octet counter $31h$ when the two counts agree. The combiner $31j$ combines the packets output from the queuing buffers $QBF_{01}$ to $QBF_{04}$ and sends the results to the egress-side queuing unit 25 via the packet combiner 33.

(b-2) Scheduler

The scheduler 32 has registers $32a_{01}$ to $32a_{74}$ in which maximum data quantities $TH_{i1}$ to $TH_{i4}$ (bytes per second) (i=0 to 7) capable of being transmitted in a fixed period of time are set per service class (iGS, iCLS, iBE, iSpare) of the input ports $P_0$ to $P_7$. Counters $32b_{01}$ to $32b_{74}$ count packet data quantities that have actually been transmitted in a set period of time per service class (iGS, iCLS, iBE, iSpare) of the input ports $P_0$ to $P_7$. A flow identification unit $32c$ refers to the headers FIH that have been added onto packets, identifies the input port numbers and service classes of transmit packets and causes transmit data quantities to be counted by the counters $32b_{01}$ to $32b_{74}$ that conform to the identified input port numbers and service classes. When packet-data transmission quantities for respective ones of the quality classes of the input ports have become equal to set maximum data quantities $TH_{i1}$ to $TH_{i4}$, i.e., when the values of the counts in the counters $32b_{01}$ to $32b_{74}$ have become equal to the set maximum data quantities $TH_{i1}$ to $TH_{i4}$, comparators $32e_{01}$ to $32e_{74}$ generate transmit-inhibit signals INH for inhibiting transmission of the respective packets until the set time elapses. A resetting unit $32f$ resets the counts in each of the counters at the set times.

A request accumulator $32g$ accumulates the 32 request signals output from the port support sections $31_0$ to $31_7$, arranges the request signals in order and outputs the signals. A group setting unit $32h$ sets first to fourth priority groups, adopts combinations of input ports and service classes of packets input from these ports as queue elements and sets the groups to which these queue elements belong. In an example shown in FIG. 5A, the group setting unit $32h$:

(1) adopts the input ports $P_0$ to $P_7$ and the service class GS at the input ports $P_0$ to $P_7$ as queue elements $P_0$-GS to $P_7$-GS of the first priority group;

(2) adopts the input ports $P_0$ to $P_7$ and the service class CLS at the input ports $P_0$ to $P_7$ as queue elements $P_0$-CLS to $P_7$-CLS of the second priority group;

(3) adopts the input ports $P_0$ to $P_7$ and the service class BE at the input ports $P_0$ to $P_7$ as queue elements $P_0$-BE to $P_7$-BE of the third priority group; and (4) adopts the input ports $P_0$ to $P_7$ and the service class Spare at the input ports $P_0$ to $P_7$ as queue elements $P_0$-Spare to $P_7$-Spare of the fourth priority group.

In an example shown in FIG. 5B, the group setting unit $32h$:

(1) adopts the input ports $P_0$ to $P_6$ and the service class GS at the input ports $P_0$ to $P_6$ as queue elements $P_0$-GS to $P_6$-GS of the first priority group;

(2) adopts the input ports $P_0$ to $P_7$ and the service class CLS at the input ports $P_0$ to $P_7$, the input port $P_7$ and service class GS at the input port $P_7$. and the input port $P_0$ and the service class BE at the input port $P_0$ as queue elements $P_7$-GS, $P_0$-CLS to $P_7$-CLS and $P_0$-BE, respectively, of the second priority group;

(3) adopts the input ports $P_1$ to $P_7$ and the service class BE at the input ports $P_1$ to $P_7$ as queue elements $P_1$-BE to $P_7$-BE of the third priority group; and (4) adopts the input ports $P_0$ to $P_7$ and the service class Spare at the input ports $P_0$ to $P_7$ as queue elements $P_0$-Spare to $P_7$-Spare of the fourth priority group.

Thus, the necessary queue elements can be included appropriately in the priority groups.

A priority mapping unit $32i$ sorts and outputs the 32 request signals by priority group. More specifically, the priority mapping unit $32i$ classifies the 32 request signals into (1) request signals conforming to the input ports/QoS (namely the queue elements) that belong to the first priority group, (2) request signals conforming to the queue elements that belong to the second priority group, (3) request signals conforming to the queue elements that belong to the third priority group and (4) request signals conforming to the queue elements that belong to the fourth priority group and outputs these signals.

An absolute-priority decision unit $32j$ executes absolute-priority decision processing, decides that a group having the highest priority among groups in which at least one queue element belonging thereto has issued a grant request signal is a packet transmit group, and outputs an enable signal to this group. More specifically, if a queue element that belongs to the first priority group has issued a request signal, the absolute-priority decision unit 32j inputs the enable signal to the first priority group. However, if a queue element that belongs to the second priority group has issued a request signal and not a queue element that belongs to the first priority group, then the absolute-priority decision unit 32j inputs the enable signal to the second priority group.

A round-robin circuit $33k_i$ (i=1 to 4 generates a queue from the queue elements of the ith priority group and issues grants (packet transmit privileges) to each of the queue elements in order by the round-robin method. The round-robin method issues grants (packet transmit privileges) to the queue elements equally and in order in the basic direction of rotation and issues the grants in compliance with a rule according to which a queue element that was issued a grant the last time falls to the lowest priority this time. The basic direction of rotation is permanently set at the time the priority groups are set. What is noteworthy here is that a grant is output strictly to a queue element in which a packet waiting to be transmitted exists (i.e., a queue element that has issued a request signal).

Figure 6A:
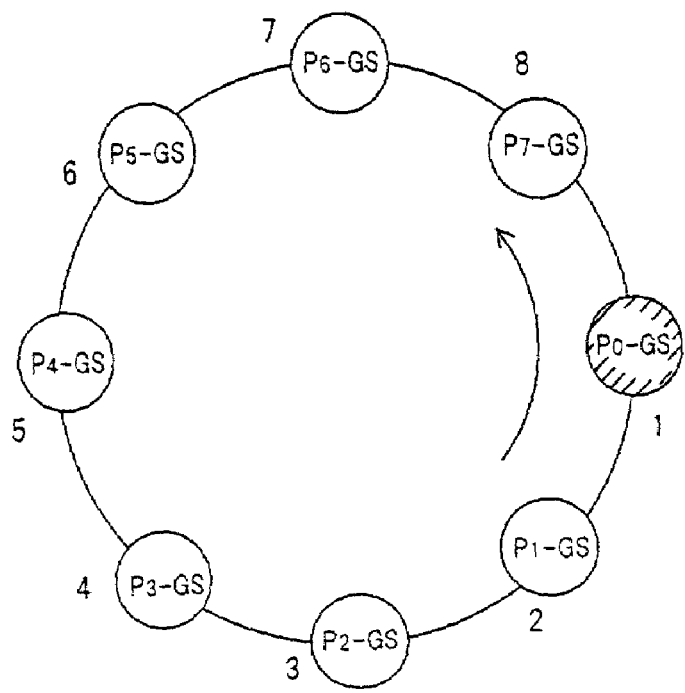
FIGS. 6A and 6B are diagrams useful in describing the round-robin method.
Figure 6B:
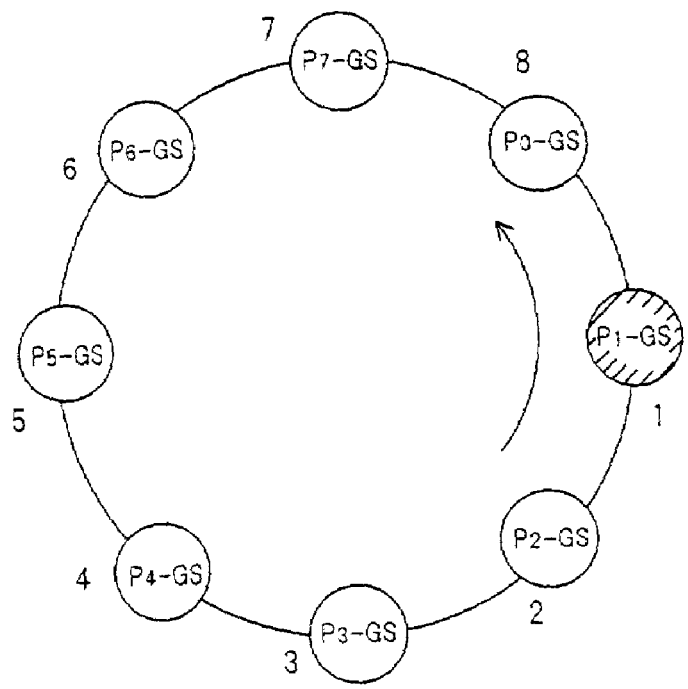

FIGS. 6A and 6B are diagrams useful in describing the round-robin method and illustrate the queue of the first priority group shown in FIG. 5A. The position indicated by shading is the head of the queue and has the highest priority. Priority decreases in order in the clockwise direction. In FIG. 6A, the priority of queue element $P_0$-GS is highest and the priority of queue element $P_7$-GS is lowest.

With the round-robin method, grants (packet transmit privileges) are issued to the queue elements equally in the order $P_0$-GS→$P_1$-GS→$P_2$-GS→$P_3$-GS→$P_4$GS→$P_5$-GS→$P_6$-GS→$P_7$-GS→$P_0$-GS→ . . . . That is, if, when the first priority group is in the state shown in FIG. 6A, a grant is issued (enable="1") to the first priority group and the packet transmit privilege (grant) is given to the leading queue element $P_0$-GS to allow the transmission of a fixed quantity of waiting packets corresponding to the queue element $P_0$-GS. When the rotate signal is generated in response to completion of this transmission, the position of each queue element is shifted by one in the counter-clockwise direction, as shown in FIG. 6B, to make the next queue element $P_1$-GS the leading queue element and make the queue element $P_0$-GS the queue element of lowest priority. If a grant is issued to the first priority group again, then the packet transmit privilege is given to the leading queue element $P_1$-GS to allow the transmission of a fixed quantity of waiting packets corresponding to the queue element $P_1$-GS. Thenceforth, and in similar fashion, grants (transmit privileges) are issued to the queue elements equally and in order. However, if a waiting packet conforming to the leading queue element of first priority does not exist, i.e., if a grant request signal has not been generated by this queue element, then the packet transmit privilege is given to queue element ($P_1$-GS in FIG. 6A) of the second priority. If a waiting packet conforming to the queue element $P_1$-GS of second priority does not exist, then the packet transmit privilege is given to queue element $P_s$-GS of the third priority. Packet transmit privileges are thenceforth given in similar fashion to queue elements for which packets waiting to be transmitted exist.

Thus, when the absolute-priority decision unit 32j generates the enable signal, the round-robin circuit $33k_i$ to which the enable signal has been input determines whether a request signal has entered from the leading queue element of its own queue. If the request signal has entered from this queue element, then the round-robin circuit $33k_i$ outputs the packet forwarding grant to the corresponding queuing buffer. If forwarding of the packet data of the assured data quantity that has been set is completed, or if the transmission of all data of waiting packets has been completed, and the rotate signal enters from the successive grant unit 31d, the leading queue element is moved to the tail end and the remaining queue elements are advanced by one, whereby the next queue element is brought to the head position.

(c) Overall Operation

FIGS. 3 and 4 above illustrate an 8-port ($P_0$ to $P_7$) scheduling unit 24. The scheduling unit 24 is composed of queue elements Queue-iGS, Queue-iCLS, Queue-iBE and Queue-iSpare, and queuing buffers $QBF_{i1}$ to $QBF_{i4}$ (i=0 to 7) corresponding to these queue elements are provided. The scheduling unit 24 performs bandwidth control with regard to these queue elements.

When a waiting packet corresponding to each queue element exists in the queuing buffer, the request signal generator 31a generates the grant request signal and inputs this signal to the scheduler 32. The absolute-priority decision unit 32j decides that a group having the highest priority among groups in which at least one queue element belonging thereto has issued a grant request signal is a packet transmit group and outputs the enable signal to this group.

Separate round-robin circuits $33k_1$ to $33k_4$ are provided for respective ones of the priority groups, and the round-robin circuit $33k_i$ of the group to which the enable signal has been applied is enabled. This round-robin circuit $33k_i$ obtains the queue element ($P_0$-GS) having the highest priority from among queue elements that have output request signals and outputs a grant signal to the queue element $P_0$-GS. The grant signal is transmitted via the grant unit 31c to the queuing buffer $QBF_{01}$ of the input port $P_0$ corresponding to the queue element $P_0$-GS. As a result, the queuing buffer $QBF_{01}$ starts the forwarding of the stored packets.

At this time the assured bandwidth value [the data quantity (bytes per second) assured for transmission] $TH_1$ that has been set in advance for the queue element $P_0$-GS is loaded into the register 31f. This is to protect the physical bandwidth allowed in a single grant with respect to the queue element $P_0$-GS. Basically, packet read-out from the queuing buffer $QBF_{01}$ corresponding to the queue element $P_0$-GS is performed continuously until the actual transmission data quantity becomes equal to the assured data quantity $TH_1$. That is, when the comparator 31i detects that the actual transmission data quantity has attained the assured data quantity, the successive grant unit 31d outputs the rotate signal to the scheduler 32. Further, even if the actual transmission data quantity has not attained the assured data quantity, the successive grant unit 31d abandons the grant state and outputs the rotate signal to the scheduler 32 if it is detected that all data of a waiting packet has been transmitted.

A packet that has been read out of the queuing buffer $QBF_{01}$ has its input port number and service class identified by the flow identification unit 32c, and the queue element is recognized as being the $P_0$-GS packet flow. As a result, the counter $32b_{01}$ conforming to the queue element $P_0$-GS in the scheduler 32 counts the packet flowrate. The counters $32b_{01}$ to $32b_{74}$ similarly count the flowrates of packet data, measure the flowrates of packets conforming to the corresponding queue elements in the set period of time and are cleared automatically when the set time arrives. A maximum bandwidth (maximum transmission data quantity in bytes per second) in a preset period of time is set for each queue element. If the count values in the counters $32b_{01}$ to $32b_{74}$ become equal to the set values, the comparators $32e_{01}$ to $32e_{74}$ output the transmit-inhibit signals INH and the request inhibit unit 31b masks the request signal conforming to the corresponding queue element in response to this transmit-inhibit signal. As a result, the scheduler 32 will no longer output a grant regardless of how many waiting packets conforming to queue elements exist.

According to the present invention, the logic for selecting priority groups is the simple absolute priority method. The reason why the simple absolute priority method is an acceptable method will now be described. The absolute priority method referred to here is a method of always selecting, in any scheduling process, the group having the highest priority at that moment. In other words, if packets exist to a certain extent in a high-priority group, a grant is circulated among the queue elements belonging to this high-priority group and is not delivered from this group to a group having a lower priority. Accordingly, with the absolute-priority method, the possibility arises that, in the worst case, the packet transmit privilege will not be given to queue elements in a low-priority group. With the present invention, however, the flowrate counters $32b_{01}$ to $32b_{74}$ are provided respective ones of the queue elements and processing is always executed to compare set flowrate with actual flowrate. If it is detected that actual flowrate has exceeded the set flowrate, the grant request signal from the particular queue element is masked. As a result, the scheduler will not output a grant to a queue element, for which the flowrate has attained the set flowrate, until the set period of time elapses. In accordance with the present invention, therefore, actual flowrate is monitored for every queue element to prevent unfair bandwidth allocation, thereby making it possible to give the packet transmit privilege to queue elements in the low-priority group.

According to the present invention, when it is detected that all data of a waiting packet has been transmitted, the grant is rescinded and a grant (packet transmit privilege) is delivered to another queue element, even if the actual transmission data quantity has not reached the assured data quantity based upon a single grant. If this arrangement is adopted, wasteful unallocated bandwidth is eliminated in shared physical bandwidth so that bandwidth can be utilized 100%. However, this method is such that rescinding of a grant is allowed regardless of the fact that the assured bandwidth is not attained and there may be some doubt as to whether bandwidth assurance allocated to each queue element will be protected. The present invention, however, controls bandwidth by the above-described masking control whenever the set time arrives and, as a result, no problems arise.

(B) Second Embodiment

Figure 7:
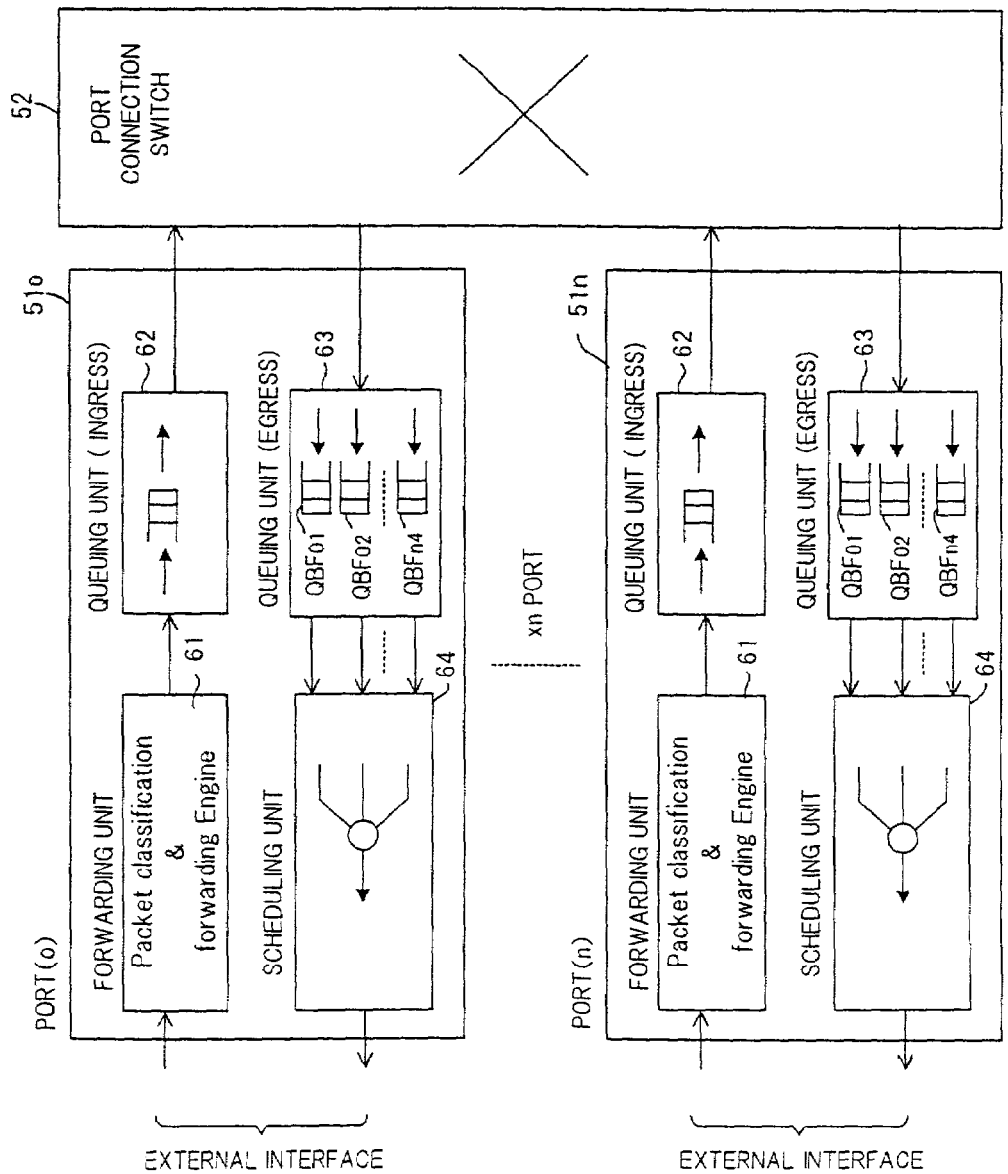
FIG. 7 is a diagram showing the overall structure of a packet switching device according to the present invention.
Figure 8:
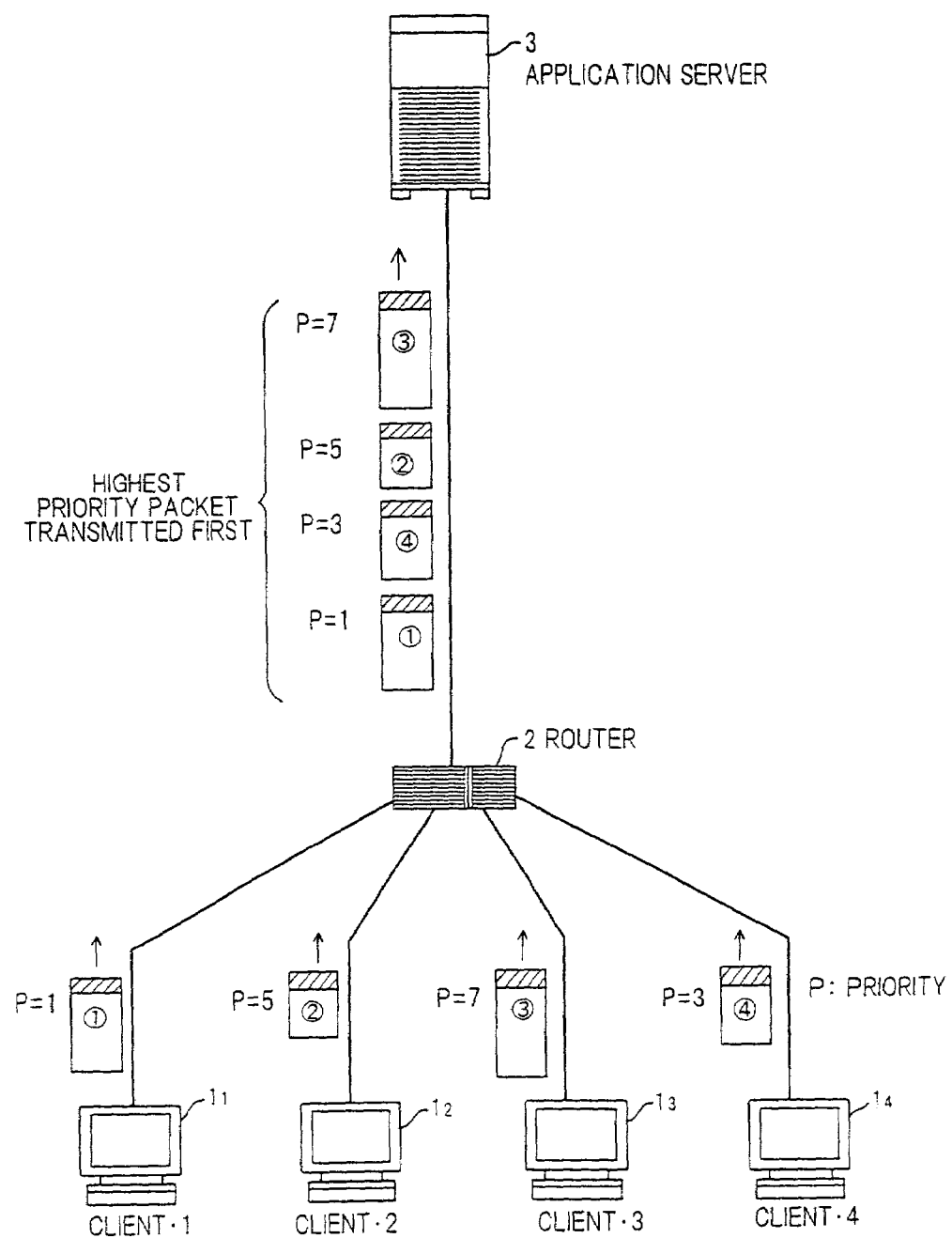
FIG. 8 is a diagram useful in describing a simple priority scheme according to the prior art.
Figure 9:
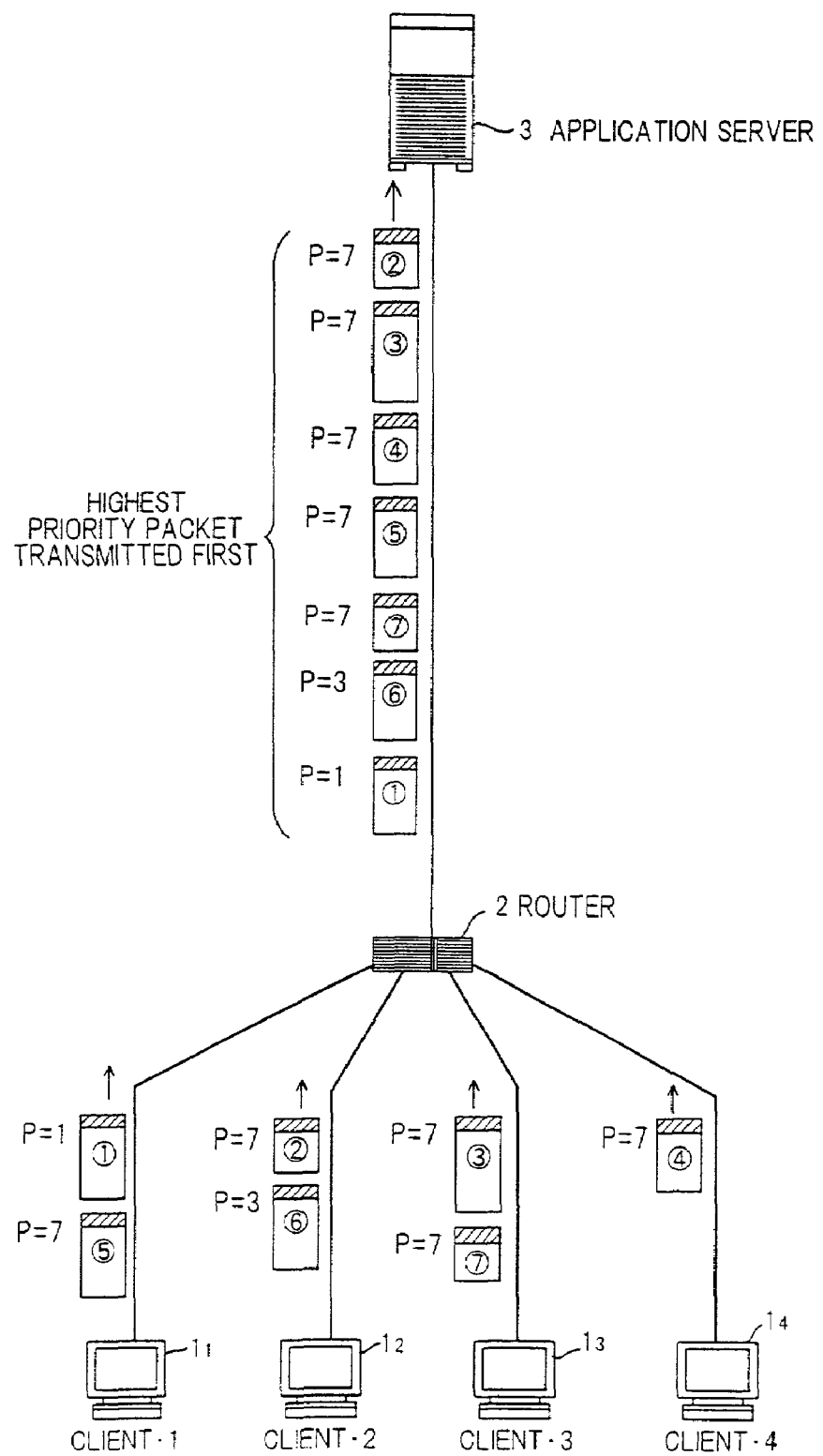
FIG. 9 is a diagram useful in describing another simple priority scheme according to the prior art.
Figure 10:
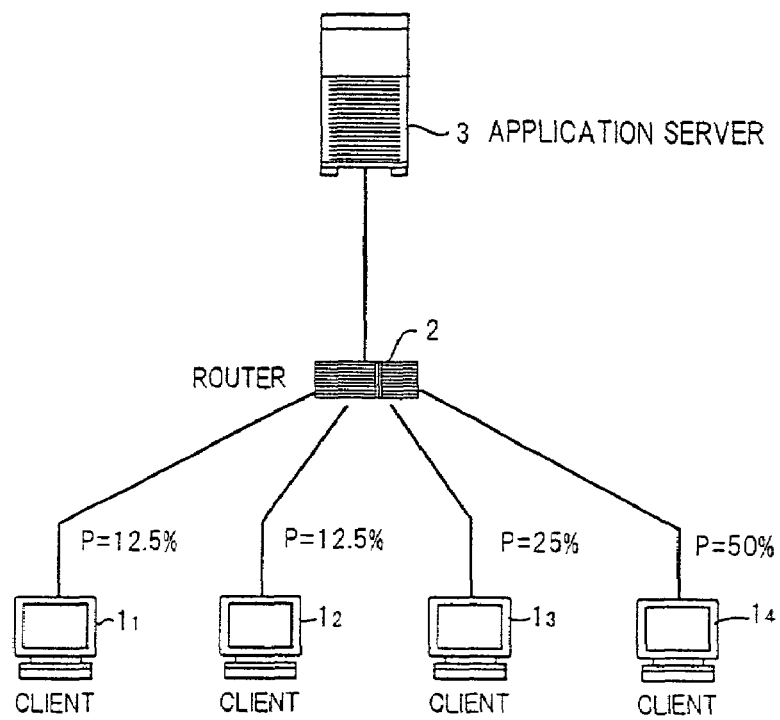
FIG. 10 is a diagram useful in describing a weighted fair queuing scheme according to the prior art.
Figure 11:
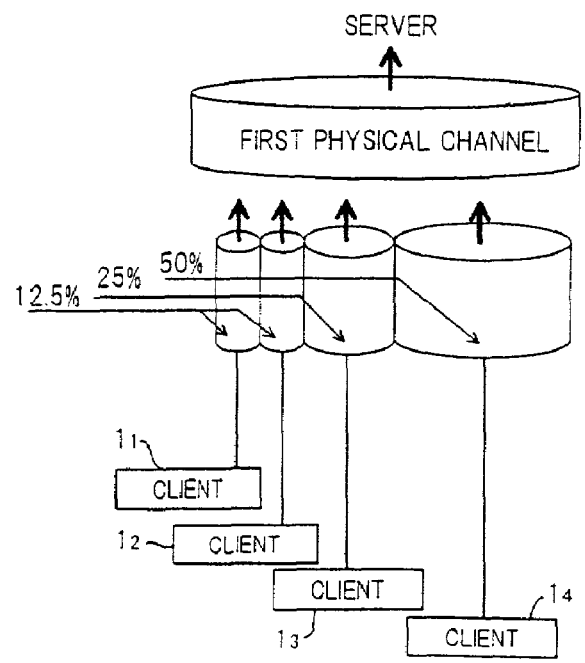
FIG. 11 is a diagram useful in describing another weighted fair queuing scheme according to the prior art.
Figure 12:
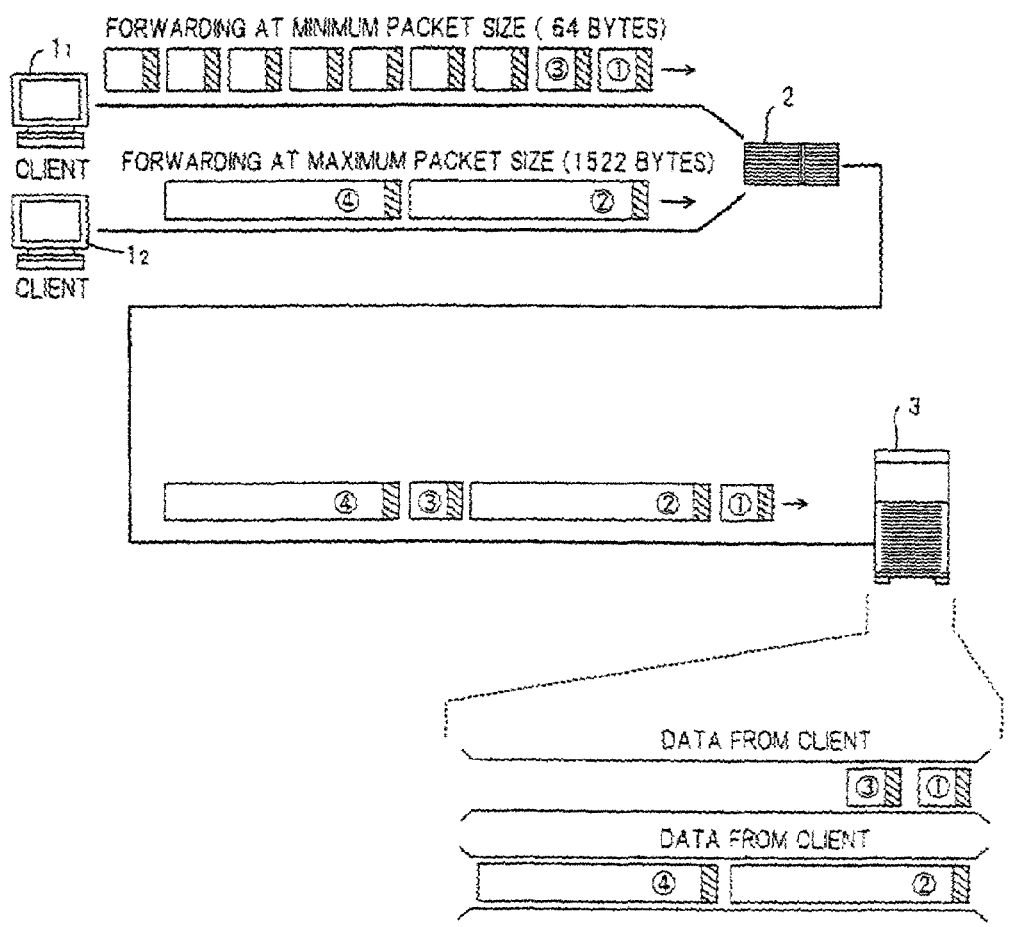
FIG. 12 is a diagram useful in describing problems with the weighted fair queuing scheme according to the prior art.
Figure 13:
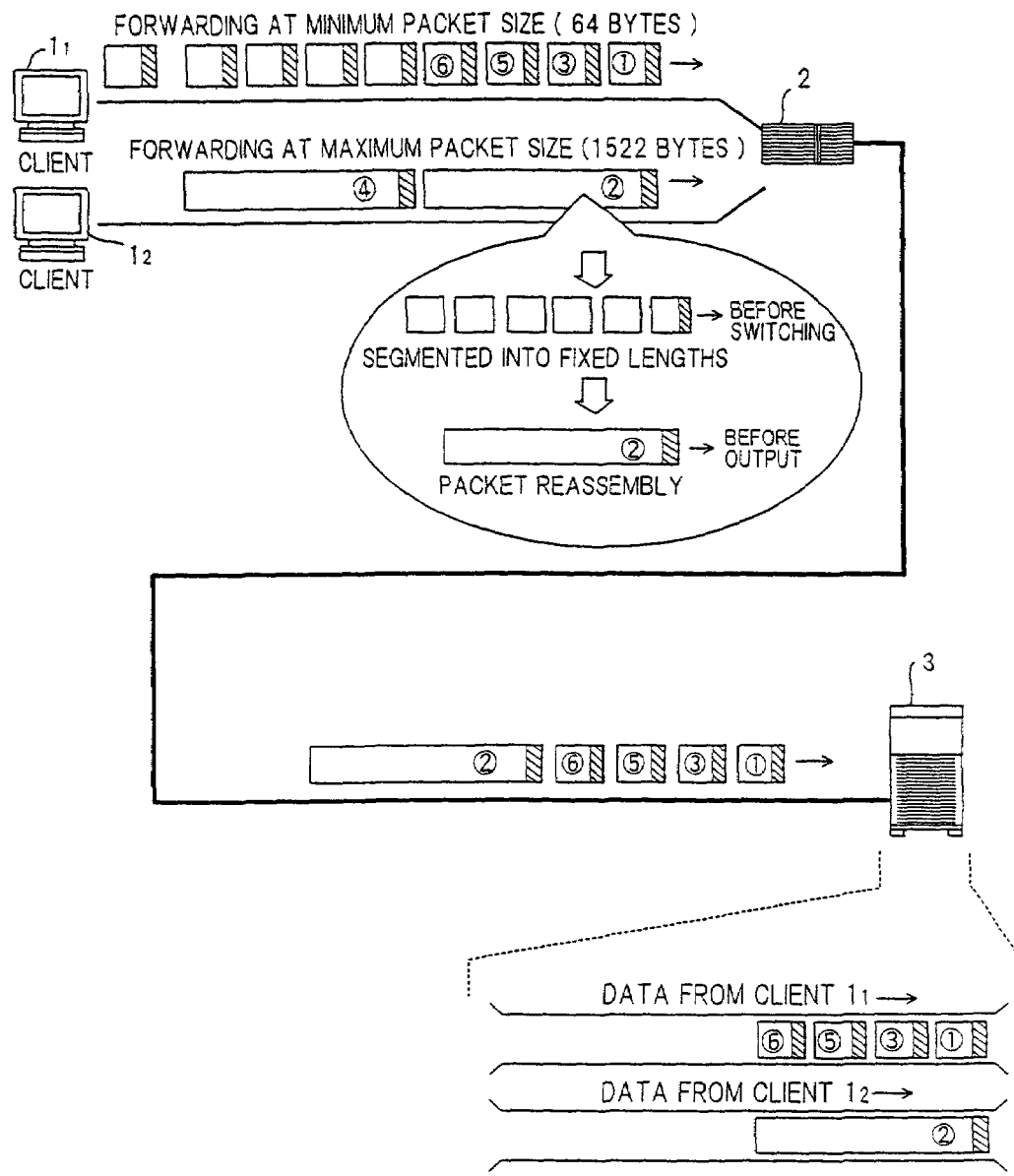
FIG. 13 is a diagram useful in describing a method of solving the problems with the weighted fair queuing scheme according to the prior art.
Figure 14:
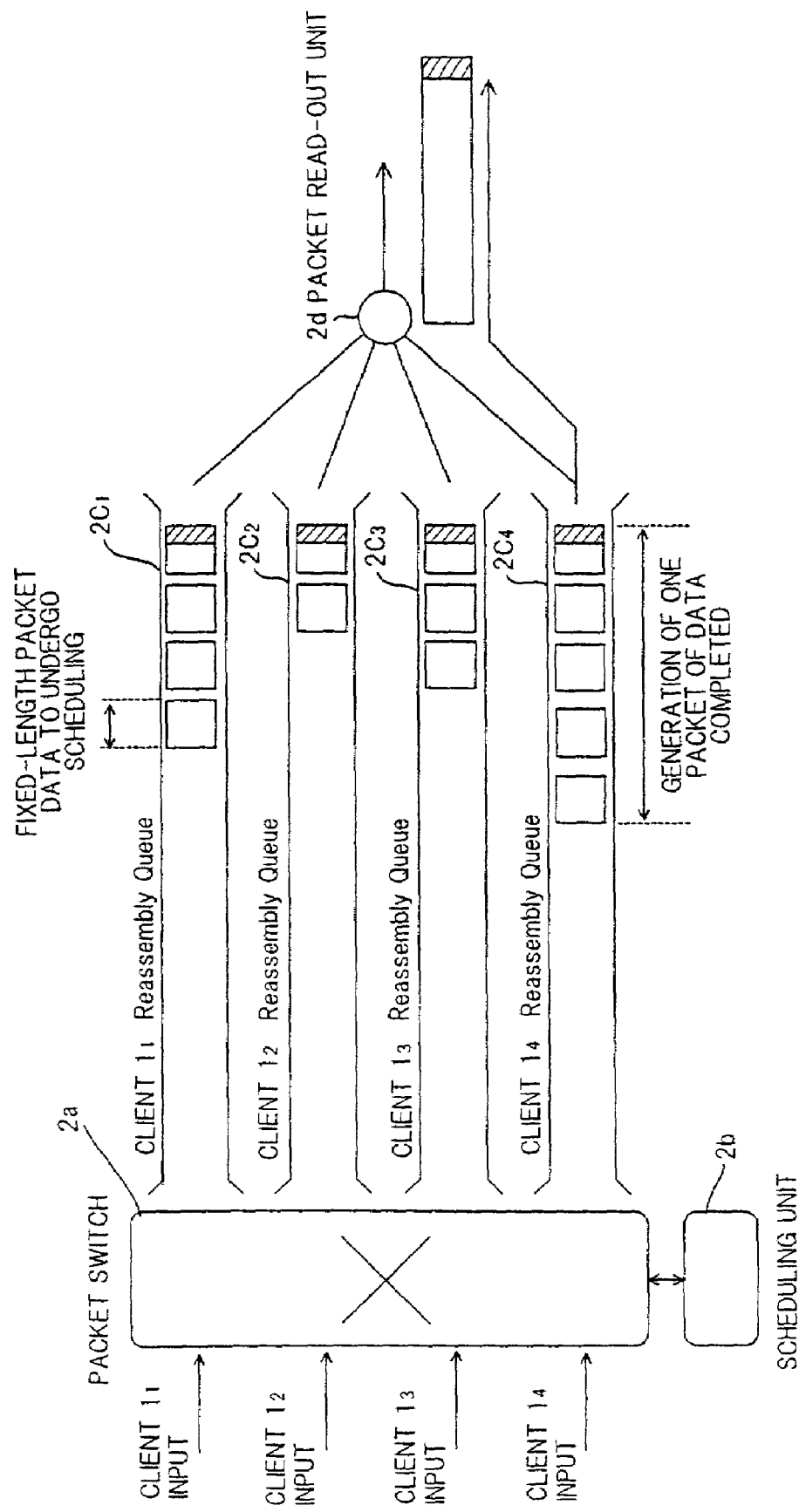
FIG. 14 is a diagram useful in describing problems encountered with the method of FIG. 13.

FIG. 7 is a diagram showing the overall structure of a packet switching device having n-number of input/output ports according to a second embodiment of present invention. This packet switching device is such that when a packet is to be transmitted to a prescribed transmission line, the device sends the packet to the transmission line by performing prescribed scheduling, port by port, based the input port at which the packet arrived and the service class of the packet.

As shown in FIG. 5, the device includes ports $51_0$ to $51_n$ provided in correspondence with a set of input/output ports, and a port connection unit (switch unit) 52 for switching a packet that arrives from each input port to a prescribed output port. The ports $51_0$ to $51_n$ are identical in construction.

Each of the ports $51_0$ to $51_n$ has, in relation to the packet input direction, a forwarding unit 61 for applying processing to a packet that enters from an interface (not shown) on the input side, and an ingress-side queuing unit 62 for connecting packets, which enter from the forwarding unit 61, into a queue and outputting the packets in order. Each of the ports $51_0$ to $51_n$ has, in relation to the output direction, an egress-side queuing unit 63 and a scheduling unit 64 for transmitting packets from an output-side interface to the transmission line in accordance with predetermined scheduling.

In a manner similar to that of the forwarding units $22_0$ to $22_n$, the forwarding unit 61 adds an in-apparatus header FIH (Frame Information Header) onto an IP packet PKT and outputs the result. The ingress-side queuing unit 62 connects packets, which enter from the forwarding unit 61, into a queue and outputs the packets in order. For example, one queuing buffer is provided and packets are accumulated/output in FIFO fashion, or a queuing buffer is provided for every QoS service class, packets supporting the service classes are accumulated in respective ones of the buffers and packets are output starting from the packets of the higher priority service classes.

The switch unit 52, which is a switch having n inputs and n outputs, switches packets that enter from the ports 510 to 517 (n=7) and outputs the packets to prescribed ports.

The egress-side queuing unit 63, which has a number of queuing buffers, sorts packets, which are output from the switch unit 52, according to the input ports of the packets, sorts the packets according to the QoS service classes and stores the sorted packets in respective ones of the queuing buffers. If the number of input ports is eight and the number of QoS service classes is four (iGS, iCLS, iBE, iSpare), then the egress-side queuing unit 63 will be provided with four queuing buffers for every input port, for a total of 32 queuing buffers $QBF_{01}$, $QBF_{02}$, . . . , $QBF_{74}$, and packets will be stored in each of these buffers.

In accordance with a predetermined schedule, the scheduling unit 64 transmits the packets that have been queued in each of the buffers $QBF_{01}$, $QBF_{02}$, . . . , $QBF_{74}$. More specifically, while managing bandwidth, the scheduling unit 64 outputs grants on a packet-by-packet basis with respect to packets that have accumulated in each of the buffers and sends the packets to the transmission lines via the output interface. The scheduling unit 64 has the structure shown in FIGS. 3 and 4 according to the first embodiment. Here, however, the queuing buffers $QBF_{01}$ to $QBF_{74}$ are illustrated.

What is noteworthy here is that packets that have entered from the input port $P_0$ are sorted according to service class (iGS, iCLS, iBE, iSpare) and are queued in the queuing buffers $QBF_{01}$ to $QBF_{04}$, packets that have entered from the input port $P_1$ are sorted according to service class (iGS, iCLS, iBE, iSpare) and are queued in the queuing buffers $QBF_{11}$ to $QBF_{14}$, and thenceforth, in similar fashion, packets that have entered from the input port $P_7$ are sorted according to service class (iGS, iCLS, iBE, iSpare) and are queued in the queuing buffers $QBF_{71}$ to $QBF_{74}$. The operation of the scheduling unit 64 is identical with that of the first embodiment.

The foregoing relates to a case where the present invention is applied to a packet switching device. However, the invention is applicable to a packet router as well.

Thus, in accordance with the present invention, bandwidth control is made possible, without segmenting variable-length packets, by making joint use of strict queuing and weighted fair queuing, thereby reducing the scale of scheduler circuitry and raising the speed of processing.

Further, in accordance with the present invention, it is arranged to adopt, as queue elements, combinations of input ports and quality classes of packets that enter from these ports, and perform bandwidth control and priority control in units of these queue elements and not in packet units. As a result, the scale of scheduler circuitry can be reduced and processing speed can be increased.

Further, in accordance with the present invention, it is possible to dispense with the need for packet segmenting processing and packet reassembly processing.

Further, in accordance with the present invention, it can be so arranged that processing time of a single scheduling cycle is shortened, i.e., so that scheduling processing time will fall within the transmission time of minimum-length packets. As a result, packet data can be output continuously, without idle bandwidth, even in circumstances where minimum-length packets are output continuously.

Further, in accordance with the present invention, queue elements are formed into absolute-priority groups of a plurality of stages and packet transmission privilege is given to each of the queue elements in regular order within the groups by the round-robin method. As a result, the frequency with which grants are delivered to specific queue elements of high priority can be raised even by the simple round-robin method.

Further, in accordance with the present invention, a priority group is selected by a simple absolute-priority scheme, thereby making it possible to execute high-speed scheduling processing by simple hardware.

Further, in accordance with the present invention, it is possible to arrange it so that queue elements belonging to each priority group can be set at will and so that no limitation is imposed upon the number of these elements. Moreover, it is possible to perform bandwidth control even if there is an imbalance in the ratio of the flowrate of a group having a high priority to the flowrate of a group having a low priority.

Further, in accordance with the present invention, it is so arranged that assured bandwidth based upon a single grant is set for every queue element. This makes it possible to control bandwidth allocated to each queue element and to manage bandwidth.

Further, in accordance with the present invention, it is so arranged that if packets to be transmitted no longer exist, a grant with regard to the particular queue element is rescinded immediately and the grant is delivered to another queue element. As a result, needlessly unallocated bandwidth is eliminated in shared physical bandwidth.

Further, in accordance with the present invention, it is arranged to set, for every queue element, the data transmission flowrate (bandwidth) of packets transmitted per prescribed period of time, monitor the data transmission flowrate of packets for every queue element, and, when the data transmission flowrate exceeds a set data transmission flowrate, inhibit the transmission of a packet corresponding to the particular queue element until a predetermined period of time elapses. This makes it possible to implement exact bandwidth control.

As many apparently widely different embodiments of the present invention can be made without departing from the spirit and scope thereof, it is to be understood that the invention is not limited to the specific embodiments thereof except as defined in the appended claims.

What is claimed is:

1. A packet transmitting apparatus for transmitting, in order, packets belonging to a plurality of groups having priorities that differ from one another, comprising:
    a queue controller for generating queues group by group and giving packet transmit privilege in order to elements constituting each of the queues;
    an assured-data-quantity setting unit for setting a data transmission quantity, which is assured by a single packet transmit privilege, for every queue element;
    a monitoring unit for monitoring an actual transmission quantity of a packet corresponding to a queue element to which the packet transmit privilege has been given;
    a control signal generator for outputting a control signal, which is for delivering the transmit privilege to the next queue element, when the actual data transmission quantity has become equal to the assured data quantity; and
    a packet-transmit group decision unit for deciding that a packet transmit group is a group having a highest priority among groups in which a packet corresponding to at least one queue element is awaiting to be transmitted;
    wherein said queue controller transmits a packet, which corresponds to a queue element having the packet transmit privilege, in the queue of the packet transmit group that has been decided by said packet-transmit group decision unit and the queue controller gives the packet transmit privilege to the next queue element based upon said control signal.

2. The apparatus according to claim 1, wherein if a packet corresponding to a queue element having the packet transmit privilege is not waiting to be transmitted, said queue controller transmits a packet waiting to be transmitted that corresponds to a queue element that is next in the order.

3. The apparatus according to claim 1, further comprising:
    a group setting unit for adopting, as queue elements, combinations of input ports and quality classes added onto packets that enter from these ports, and setting groups to each of which these queue elements belong;
    wherein said queue controller gives the packet transmit privilege, equally and in order in round-robin fashion, to each of the queue elements queue by queue.

4. The apparatus according to claim 1, further comprising:
    a buffer for storing a packet, which is waiting to be transmitted, for every queue element; and
    a request generator for generating a transmit request signal for every queue element corresponding to a buffer in which a packet waiting to be transmitted has been stored;
    wherein said transmit-group decision unit identities groups in which a packet waiting to be transmitted exists based upon whether or not there is a transmit request signal from at least one of the queue elements belonging to each of the groups, and decides that a group having the highest priority among these groups is the packet transmit group.

5. The apparatus according to claim, 1 wherein said control signal generator outputs the control signal when it is detected that all packets have been transmitted from a buffer before the actual data transmission quantity exceeds the assured data transmission quantity.

6. The apparatus according to claim 1, further comprising:
    a data-transmission flowrate setting unit for setting data transmission flowrate, which is transmitted per set period of time, for every queue element;
    means for monitoring actual data transmission flowrate per the set period of time for every queue element; and
    packet-transmit inhibiting means for monitoring the actual data transmission flowrate for every queue element, and generating a transmit-inhibit signal which inhibits transmission of a packet corresponding to the queue element, until the set period of time elapses, when the actual data transmission flowrate has become equal to the set data transmission flowrate.

7. The apparatus according to claim 6, wherein said packet-transmit inhibiting means clears the actual data transmission flowrate to zero and cancels transmit inhibit every said set period of time.

8. The apparatus according to claim 7, further comprising:
   a buffer for storing a packet, which is waiting to be transmitted, for every queue element; and
   a request generator for generating a transmit request signal for every queue element corresponding to a buffer in which a packet waiting to be transmitted has been stored;
   wherein when the transmit-inhibit signal has been generated with respect to a certain queue element, said request generator forgoes generation of the request signal even if a packet that is waiting to be transmitted corresponding to this queue element exists;
   said packet-transmit group decision unit identifies groups in which a packet waiting to be transmitted exists based upon whether or not there is a transmit request signal from at least one of queue elements belonging to each of the groups, and decides that a group having the highest priority among these groups is the packet transmit group.

\* \* \* \* \*